US006941817B2

(12) United States Patent
King et al.

(10) Patent No.: US 6,941,817 B2
(45) Date of Patent: Sep. 13, 2005

(54) SHAFT DELASHING METHOD AND ASSEMBLY WITH WIRELESS INTERFACE

(75) Inventors: David E. King, Freeland, MI (US); William Henry Wittig, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 26 days.

(21) Appl. No.: 10/648,115

(22) Filed: Aug. 26, 2003

(65) Prior Publication Data

US 2005/0044961 A1    Mar. 3, 2005

(51) Int. Cl.[7] ............................................. F16B 31/02
(52) U.S. Cl. ........................................................ 73/761
(58) Field of Search ............................ 73/761, 862.08, 73/862.191, 862.21

(56) References Cited

U.S. PATENT DOCUMENTS

| | | | | |
|---|---|---|---|---|
| 4,185,511 A | * | 1/1980 | Blackburn et al. | 192/56.61 |
| 4,562,746 A | * | 1/1986 | Petit | 73/862.23 |
| 4,590,826 A | | 5/1986 | McKean | 81/53.2 |
| 4,613,800 A | | 9/1986 | Jeppsson | 318/434 |
| 4,614,077 A | * | 9/1986 | Muto et al. | 53/490 |
| 4,959,797 A | * | 9/1990 | McIntosh | 700/275 |
| 5,335,556 A | * | 8/1994 | Mogilnicki | 73/862.21 |
| 5,367,915 A | | 11/1994 | Nishii | 74/441 |
| 5,609,077 A | * | 3/1997 | Ohmi et al. | 81/57.13 |
| 5,644,951 A | | 7/1997 | Hatamura | 74/89.15 |
| 5,895,867 A | | 4/1999 | Lauener | 73/862.29 |
| 6,316,903 B1 | | 11/2001 | Shamoto | 318/700 |
| 6,349,606 B1 | | 2/2002 | Pawlenko et al. | 74/441 |
| 6,354,395 B1 | | 3/2002 | Cheng et al. | |
| 6,371,218 B1 | * | 4/2002 | Amano et al. | 173/183 |
| 6,499,369 B1 | | 12/2002 | Piotrowski et al. | 74/89.42 |
| 6,520,042 B2 | | 2/2003 | Jammer et al. | |
| 6,523,431 B2 | | 2/2003 | Ozsoylu et al. | |

* cited by examiner

Primary Examiner—Max Noori
(74) Attorney, Agent, or Firm—Michael D. Smith

(57) ABSTRACT

A delashing assembly includes a tightening device for tightening a nut in relation to a main shaft supported on bearings and a wireless interface, wherein torque information is received by the tightening device over the wireless interface. A main shaft and main nut assembly, as well as a steering system, may include the delashing assembly. A method of delashing the main shaft and main nut assembly includes providing a tightening device on a first end of the main shaft and sending torque information from a second end of the main shaft to the tightening device over the wireless interface.

18 Claims, 3 Drawing Sheets

SHAFT DELASHING METHOD AND ASSEMBLY WITH WIRELESS INTERFACE

BACKGROUND OF THE INVENTION

This invention relates generally to shaft and nut assemblies, and, more particularly, this invention relates to a system for delashing a shaft and nut assembly.

One of the more common problems associated with shaft drive assemblies involves axial play or backlash between the bearings and shaft. This backlash, which is a function of the manufacturing tolerances associated with the drive assembly components, causes uneven wear, noise, and poor response when either the shaft or bearings begin traveling axially along the other. Examples of this type of assembly include worm/wormgear and ball-screw/ball-nut drives. In each case, a time varying axial load is exerted on a shaft, which may cause the previously noted problems in the presence of backlash in its mounting(s). Electric steering mechanisms, as many others, require shaft and ball bearing assemblies wherein the axial lash must be removed from the ball bearings without adding substantial friction to the assembly which would degrade the overall performance.

In some cases, such shaft/bearing assemblies employ springs bearing on the inner or outer races of the ball bearing assemblies, which, when preloaded, remove the axial lash. Such solutions, however, have relatively high compliance and are still prone to rattle under extreme vibratory duress or impact, and the manufacturer must recover the cost of the springs, the preparation of the mounting surfaces, etc. In other cases, simple nut tensioning devices are used, such that in tightening the nut onto the shaft or into the support housing, the inner or outer race of the ball bearing assembly may be slightly displaced, again removing the axial lash. These approaches are all too frequently difficult to control, as axial force is dependent on thread condition, cleanliness, fit, and other such concerns.

Pains have been taken in certain cases to tighten the nut portion of the assembly by some automated technique, tightening the shaft/nut interface while simultaneously measuring the assembly's resistance to rotation. This approach has the problem in that it is difficult to apply torque to the shaft without affecting the sensed reaction at the same time. Further, because the tightening mechanism remains coupled to some degree with the torque sensing device, the measurement of the shaft assembly's resistance to rotation is easily confounded.

BRIEF SUMMARY OF THE INVENTION

The above discussed and other drawbacks and deficiencies are overcome or alleviated by a delashing assembly including a tightening device for tightening a nut in relation to a main shaft supported on bearings and a wireless interface, wherein torque information is received by the tightening device over the wireless interface.

In another embodiment, a main shaft and main nut assembly include a main shaft having a first end and a second end, a main nut, bearings received between the main shaft and the main nut, and a delashing assembly. The delashing assembly includes a tightening device associated with the first end of the main shaft for tightening the main nut in relation to the main shaft and a wireless interface, wherein torque information is received by the tightening device over the wireless interface.

In another embodiment, a steering system includes a steering shaft, a driven shaft having a first end and a second end and forming an intermediate portion of the steering shaft, a main nut, bearings received between the driven shaft and the main nut, and a delashing assembly. The delashing assembly includes a tightening device associated with the first end of the driven shaft for tightening the main nut in relation to the driven shaft and a wireless interface, wherein torque information is received by the tightening device over the wireless interface.

In another embodiment, a method of delashing a main shaft supported on bearings and main nut assembly includes providing a tightening device on a first end of the main shaft and sending torque information from a second end of the main shaft to the tightening device over a wireless interface.

The above discussed and other features and advantages of the present invention will be appreciated and understood by those skilled in the art from the following detailed description and drawings.

DETAILED DESCRIPTION OF THE INVENTION

Figure 1:
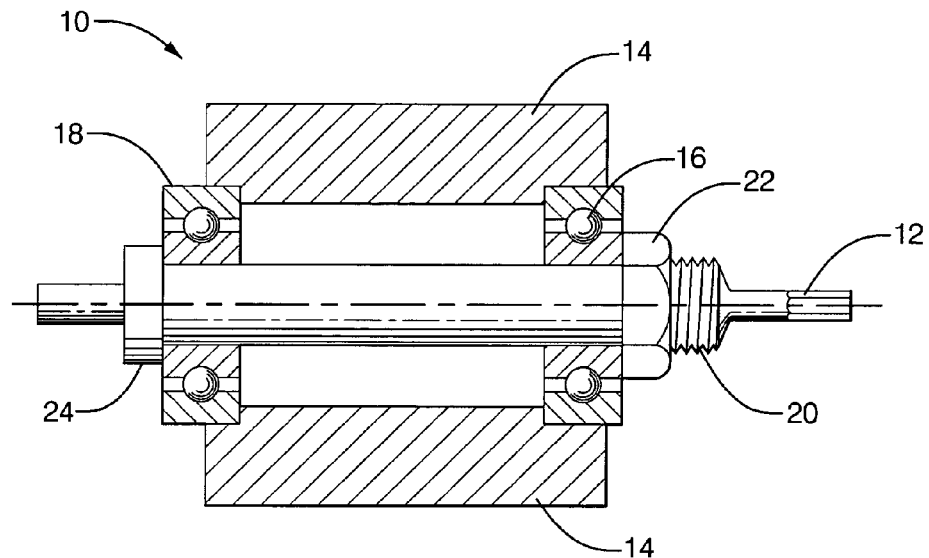
FIG. 1 shows a side cross-sectional view of a generic shaft assembly.

Referring to FIG. 1, a shaft assembly is shown generally at 10. Shaft assembly 10 comprises a shaft 12 supported in a housing 14, supported on ball bearings 16 and 18. While ball bearings are specifically described, it should be understood that other types of bearings, such as, but not limited to, roller bearings are also within the scope of the shaft assembly 10. The shaft is delashed by applying a tension force on the shaft 12 by tightening the torque prevailing nut 22 on a threaded section of the shaft 20 reacting against the shoulder 24 on the opposite end of the shaft. Proper tensioning of the torque prevailing nut 22 is required yet difficult to control. It should be understood that "torque prevailing" infers an interference thread, one which, once assembled and torqued to a set load, remains loaded by virtue of an interference of some kind with its mating element, such as a lock nut.

The shaft delashing method with wireless interface described herein removes the mechanical interface "to ground" between a threaded tightening device and a torque sensing/limiting device via a wireless interface.

Figure 2:
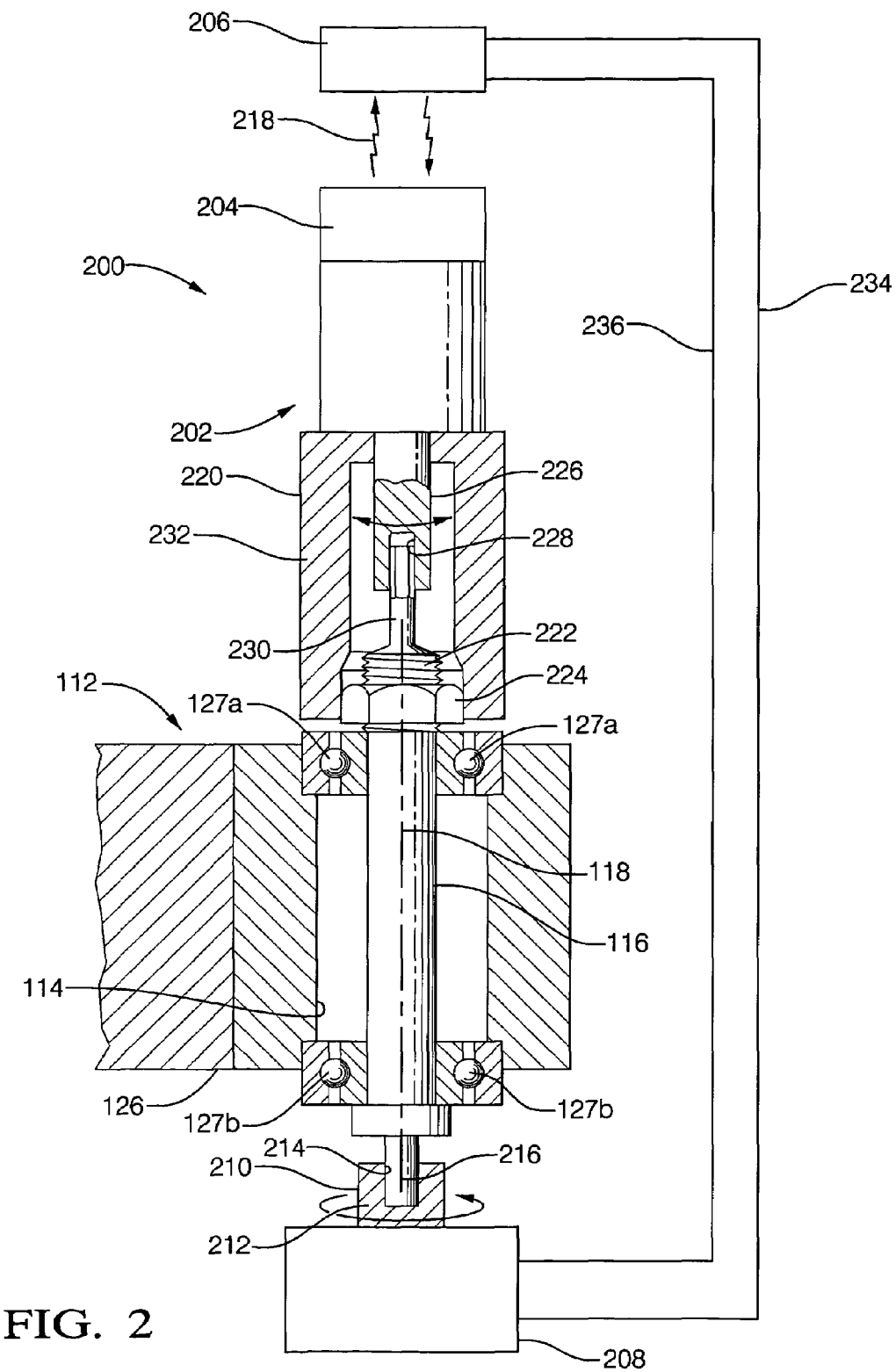
FIG. 2 shows a side cross-sectional view of the shaft and nut assembly of FIG. 1 and a delashing assembly of the present invention.

Turning now to FIG. 2, the shaft delashing assembly 200 may include a self contained, battery operated nut/shaft tightening device 202. Although the tightening device 202 is preferably battery operated, it should be understood that other types of power sources that can provide adequate power for accomplishing the same tightening procedure for the delashing assembly 200 would be within the scope of this invention. The tightening device 202 is preferably easily disconnectable from the shaft assembly 112.

The entire tightening device 202 rotates with the shaft 116 as the adjustment is made. As shown, the tightening device 202 preferably includes a tightening interface 220. The tightening interface 220 serves to mechanically connect the tightening device 202 to a torque prevailing nut 224 through which the shaft end 222 passes concentrically through. The tightening interface 220 is rotated independently of the rotating shaft 226, thereby tightening or loosening the nut 224 by rotating it about the longitudinal axis 118 and thereby increasing or decreasing the axial force applied by the nut 224 to the shaft 116. The tightening device 202 is mounted to the shaft assembly 112 via a pocket 228 for receiving a first turning end portion 230 which is connected to the shaft end 222. The mounting interface 226, which contains the pocket 228, supports the battery powered tightening device and its wireless interface 204.

While a specific embodiment of a tightening interface 220 is described, it should be understood that alternate connections between the tightening device 202 and the shaft 116 may be envisioned and would be within the scope of this invention. Furthermore, while the nut/shaft tightening device 202 is described in conjunction with the shaft 116 and the tightening of an inner bearing race, it should be understood that it would also be within the scope of this invention to employ a tightening device which tightens a nut associated with the housing 126, thus tightening the outer bearing race rather than the inner one, and any tightening interface which would accompany such an alternative arrangement would also be within the scope of this invention.

The tightening device 202 is preferably in connection with a first wireless communication device 204. The first wireless communication device 204 is both a transmitter and receiver. A second wireless communication device 206, also both a transmitter and receiver, is associated with a motor drive 208, rigged to drive the shaft and nut assembly 112. The motor drive 208 and the second wireless communication device 206 may be electrically connected through electrical connectors 234, 236. A wireless interface 218 is created between the first and second wireless communication devices 204, 206 whereby information regarding the torquing via the tightening device 202 may be sent to and received by the motor drive 208, such as through the first wireless communication device 204, wireless interface 218, second wireless communication device 206, and electrical connector 234. Likewise, information regarding the torquing via the motor drive 208 is sent to and received by the tightening device 202, such as through electrical connector 236, second wireless communication device 206, wireless interface 218 and first wireless communication device 204. It should be noted that at least one way communication, from the motor drive 208 to the tightening device 202 is required, however, 2-way communication, which would include both communication from the motor drive 208 to the tightening device 202 and from the tightening device 202 to the motor drive 208, may advantageously be used for additional coordination, e.g. a "seating" sequence operation and also for processing data recordings and is therefore desired. The first and second wireless communication devices 204, 206 may be any suitable wireless transmitter and receivers, such as radio frequency ("RF"), IR, or digital telemetry, or any other known wireless communication system. One embodiment that has been effectively employed is IR communication such as employed in TV remote controls and as embodied in the Lego™ Mindstorms RCX. As previously stated, however, any other suitable wireless communication device would be within the scope of this invention.

The motor drive 208 contains or is otherwise associated with, a torque sensing device. The motor drive 208 also includes a preferably easily disconnectable drive interface 210. The drive interface 210 may include a rotatable shaft 212, rotatable about the longitudinal axis 118, and having a pocket 214 for receiving a second turning end portion 216 extending from or otherwise attached to the shaft 116. The second turning end portion 216 and the pocket 214 may be externally or internally threaded, respectively, for engagement, or may include a snap fit, spline, or any other desirable type of mechanical engagement. Although only one exemplary drive interface 210 is specifically demonstrated, it should be understood that any type of interface would be within the scope of this invention, including, but not limited to magnetic, mechanical, etc. It should be understood that while the tightening device 202 tightens the shaft end 222 and torque nut 224, with respect to the shaft and nut assembly 112, the motor drive 208 causes a rotation of the shaft 116 such as would be experienced during normal operation of the shaft and nut assembly 112.

In a method of employing the delashing assembly 200, the shaft and nut assembly 112 may be loosely fitted together, oriented with the shaft 116, in a vertical or horizontal position. The tightening device 202 may then be attached, with the first wireless communication device 204 pointing upward, or in the same direction as the longitudinal axis 118. The shaft and nut assembly 112, via the shaft 116, may then be set in motion via the torque sensing motor drive 208, preferably via the easily disconnected drive interface 210. The second wireless communication device 206 associated with the motor drive 208 is preferably pointed to the interface of the nut/shaft tightening device 202 if IR technology is employed as IR is line of sight and therefore the wireless communication devices would have to be pointed at each other. An RF wireless system, however, would be insensitive to orientation of either device 204 or 206 as long as they are within communication range. The tightening device 202 is capable of bringing the parts of the assembly 112 together, and continuing until the torque sensed by the torque sensor associated with the drive motor 208 reaches some predetermined value, a limiting rotational torque, at which time it signals the tightening device 202 to stop tightening via the wireless interface 218. In a current exemplary EPS system, the predetermined value is approximately 0.8 Nm turning torque, however alternate sizes and styles of shaft and nut assemblies would dictate the actual predetermined value and therefore any suitable predetermined value would be within the scope of this invention.

In another embodiment of the method of employing the delashing assembly 200, the sequence of events may be slightly altered to first "seat" the shaft and bearing components before setting the limit rotational torque by tightening the nut 224 until the torque reaches a value exceeding the desired turning torque and then loosening the nut until the turning torque decreases to the desired value. Also, it is within the scope of this invention to reconfigure the torque of the drive motor 208 over a variety of shaft, bearing and delash nut combinations, e.g. when the nut is associated with the housing and tightening the outer bearing race rather than the inner one. Further, the use of an interference-type locking nut (torque prevailing nut 224) is advantageously prone to repeatability, as the torque sensor associated with the motor drive 208 is decoupled from the tightening device 202.

Figure 3:
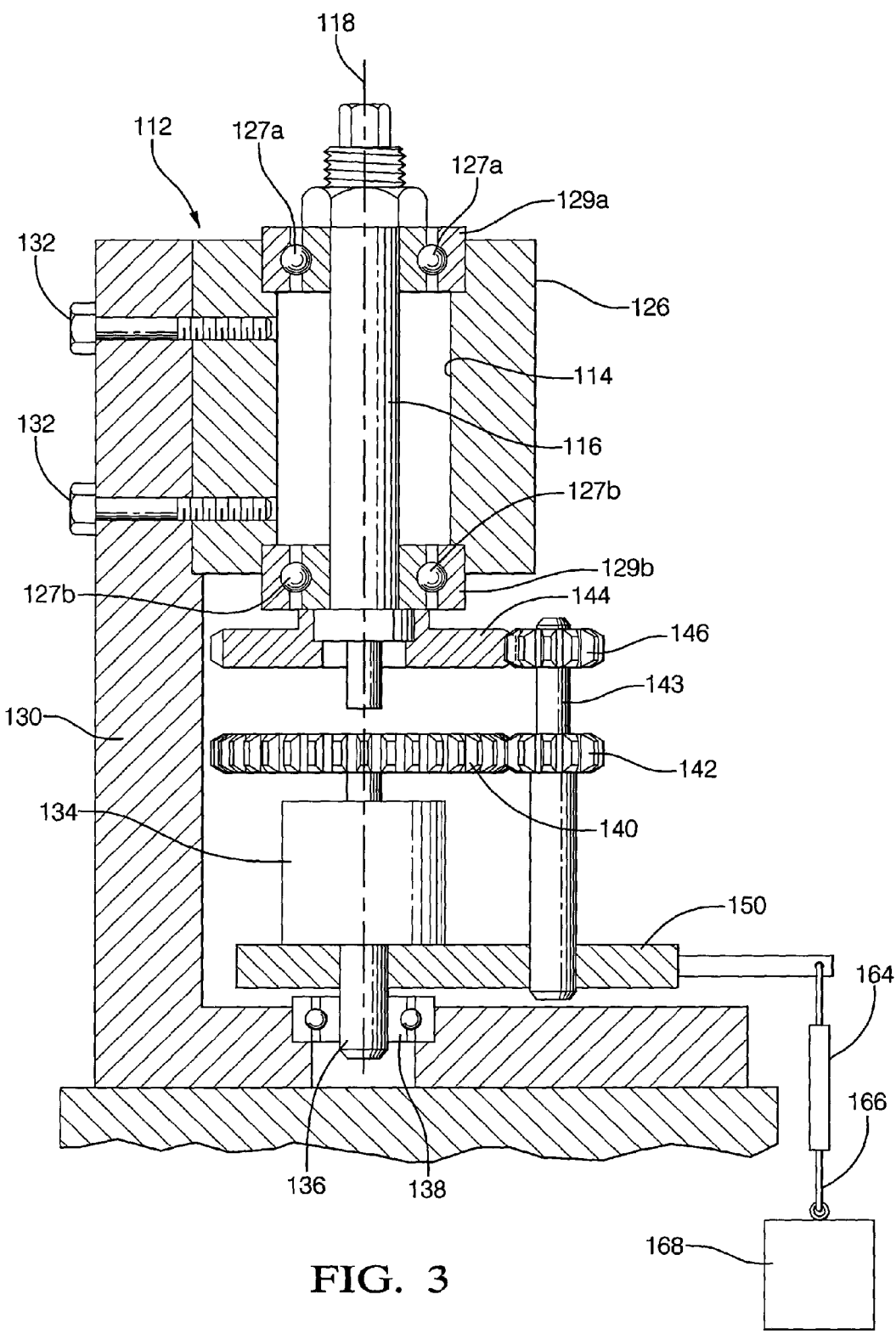
FIG. 3 shows a simplified embodiment of a delashing assembly implementation; and, FIG. 4 show a partial top view of FIG. 3.

FIG. 3 shows a simplified embodiment of the shaft and nut assembly and drive motor/torque sensor for use with the shaft delashing assembly as will be further described. The shaft and nut assembly 112 may be part of a steering system as previously described, however, it is within the scope of the shaft delashing assembly to be utilized for shaft and nut assemblies for alternative purposes. The shaft and nut assembly 112 includes a housing 114 attached to a fixture 130 via bolts 132. The housing 114 supports a shaft 116 having a longitudinal axis 118. The shaft 116 is rotatably supported by ball bearings 127a, 127b encapsulated within races 129a, 129b. While ball bearings are races are specifically described, it should be understood that other types of bearings trapped between the shaft and nut are also within the scope of the assembly.

Figure 4:
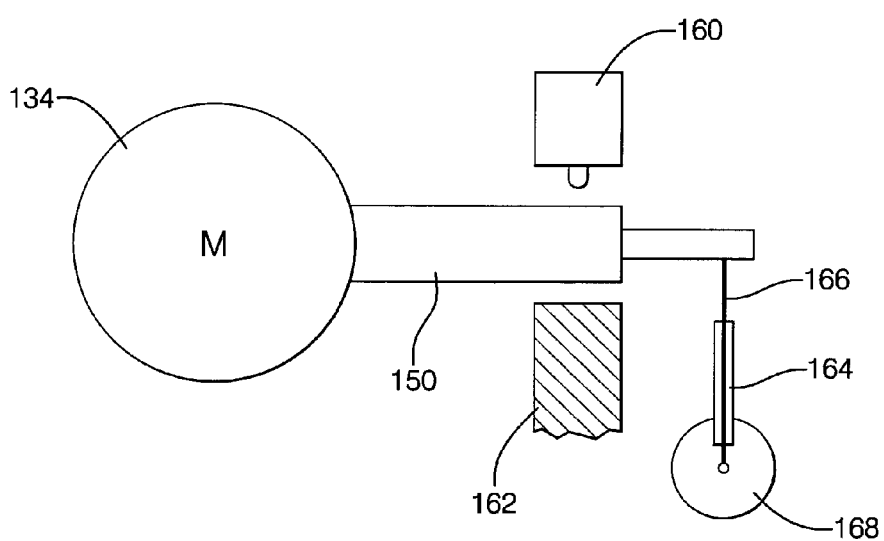

As shown in both FIGS. 3 and 4, the drive motor 134 may be attached to a fixture 130 via a shaft 136 and bearing 138 which allow it to rotate in reaction to the torque applied to the shaft 116. The torque of the motor 134 is transmitted to the shaft 116 via a set of gears 140, 142, 144, and 146. That is, gear 140 may rotate gear 142 via meshing teeth. Gear 142 may be connected to gear 146 by a fixedly connected rod 143 or other connection such that rotation of gear 142 rotates gear 146. Gear 146 may then rotate gear 144 via meshing teeth. Rotation of gear 144 rotates shaft 116. The torque is measured by measuring the force in the arm 150 using any of a variety of methods. One exemplary method may utilize a dead weight 168 attached to the arm 150 via a string/cable 166 and supported by a pulley 164 so that when the required force is reached, the torque causes the arm 150 to rotate off of a stop 162 and press against a switch 160 thus stopping the drive motor 134 and corresponding rotation of the shaft 116. It should be understood that the shaft assembly 112 shown in FIG. 3, as well as alternate shaft assemblies with alternate motor/torque sensor configurations may be delashed using the delashing assembly 200 shown in FIG. 2.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A delashing assembly comprising:
    a tightening device for tightening a nut onto a main shaft supported on bearings;
    a wireless interface;
    a motor drive for rotating the main shaft;
    a torque sensor associated with the motor drive;
    wherein torque information from the motor drive and torque sensor is sent to the tightening device over the wireless interface.

2. The delashing assembly of claim 1 wherein the motor drive is positioned adjacent a second end of the main shaft and the tightening device is positioned adjacent a first and opposite end of the main shaft.

3. A delashing assembly comprising:
    a tightening device for tightening a nut in relation to a main shaft supported on bearings;
    a wireless interface, wherein torque information is received by the tightening device over the wireless interface;
    a first wireless communication device in association with the tightening device; and,
    a second wireless communication device in wireless communication with the first wireless communication device through the wireless interface;
    wherein the first and second wireless communication devices each comprise a wireless transmitter and receiver.

4. The delashing assembly of claim 3 wherein the first and second wireless communication devices are unattached and positioned within communication range of each other to create the wireless interface.

5. The delashing assembly of claim 3 further comprising:
    a motor drive for rotating the main shaft;
    a torque sensor associated with the motor drive;
    wherein the second wireless communication device is in communication with the motor drive and torque sensor.

6. The delashing assembly of claim 5 wherein communication between the second wireless communication device and the motor drive and torque sensor is through an electrical conductor.

7. The delashing assembly of claim 3 wherein the tightening device is battery operated.

8. A delashing assembly comprising:
    a tightening device for tightening a nut in relation to a main shaft supported on bearings;
    a wireless interface;
    wherein torque information is received by the tightening device over the wireless interface; and further wherein the tightening device rotates with a shaft assembly, the shaft assembly including the main shaft, and wherein the tightening device includes a tightening interface, the tightening interface attached to the nut on the main shaft for tightening or loosening the nut on the main shaft while rotating with the shaft assembly.

9. An main shaft and main nut assembly comprising:
    a main shaft having a first end and a second end;
    bearings received between the main shaft and a housing for rotatably supporting the main shaft; and,
    a delashing assembly, the delashing assembly comprising:
    a tightening device associated with the first end of the main shaft for tightening a torque nut onto the main shaft; and,
    a wireless interface;
    wherein torque information from the second end of the main shaft is received by the tightening device over the wireless interface.

10. The assembly of claim 9 further comprising:
    a motor drive for rotating the main shaft;
    a torque sensor associated with the motor drive;
    wherein torque information from the motor drive and torque sensor is sent to the tightening device over the wireless interface.

11. The assembly of claim 9 further comprising:
    a first wireless communication device in association with the tightening device; and,
    a second wireless communication device in wireless communication with the first wireless communication device through the wireless interface, wherein the first and second wireless communication devices each comprise a wireless transmitter and receiver, and wherein the first and second wireless communication devices are unattached and positioned within communication range of each other to create the wireless interface.

12. The assembly of claim 11 further comprising:
    a motor drive for rotating the main shaft;
    a torque sensor associated with the motor drive;
    wherein the second wireless communication device is in communication with the motor drive and torque sensor.

13. The assembly of claim 9 wherein the tightening device rotates with the main shaft and wherein the tightening device includes a tightening interface, the tightening interface attached to the torque nut on the main shaft for tightening or loosening the torque nut on the main shaft while rotating with the main shaft.

14. The assembly of claim 9 wherein the tightening device is battery operated.

15. The assembly of claim 9 further comprising a drive motor and torque sensor positioned on the second end of the main shaft, wherein torque information is sent from the tightening device on the first end of the main shaft to the drive motor and torque sensor on the second end of the main shaft.

16. A method of delashing a assembly wherein the shaft assembly includes a main shaft rotatably supported on bearings, the method comprising:
providing a tightening device on a first end of the main shaft for tightening or loosening a torque nut on the main shaft;
rotating the main shaft; and,
sending torque information from a second end of the main shaft to the tightening device over a wireless interface.

17. The method of claim 16 further comprising sending torque information from the tightening device to the second end of the main shaft over the wireless interface.

18. The method of claim 16 further comprising:
providing a first wireless communication device in association with the tightening device;
providing a second wireless communication device in an area communicable with the first wireless communication device over the wireless interface;
providing a drive motor with associated torque sensor on the second end of the main shaft; and,
sending torque information from the torque sensor to the second wireless communication device.

* * * * *